M. TÖPFER.
DRYING OR CONDENSING APPARATUS.
APPLICATION FILED OCT. 16, 1909.
953,807.  Patented Apr. 5, 1910.
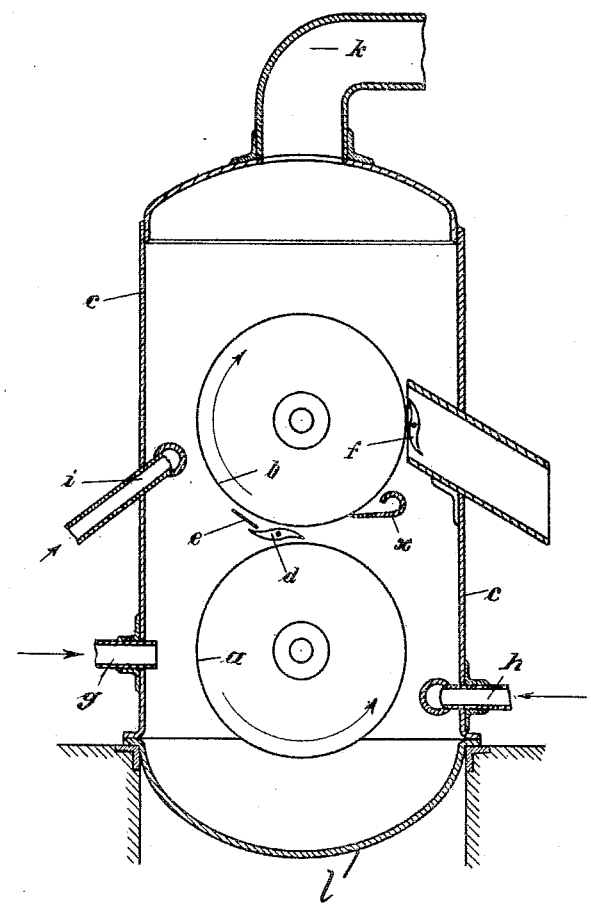
Witnesses.  Inventor
Max Töpfer
Attorney

UNITED STATES PATENT OFFICE.

MAX TÖPFER, OF RITTERGUT GROSSZSCHOCHER, NEAR LEIPZIG, GERMANY.

DRYING OR CONDENSING APPARATUS.

953,807.  Specification of Letters Patent.  Patented Apr. 5, 1910.

Application filed October 16, 1909. Serial No. 522,947.

*To all whom it may concern:*

Be it known that I, MAX TÖPFER, a subject of the King of Saxony, residing at Rittergut Grosszschocher, near Leipzig, in Germany, have invented certain new and useful Improvements in Drying or Condensing Apparatus, of which the following is a specification.

This invention relates to apparatus for condensing and drying milk and other mixtures of liquids and solids, and its object is to improve the qualities such as durability, solubility and flavor of the materials treated in such apparatus.

In the preparation of milk powder it has been proposed to separate the cream from the milk prior to the evaporation, and then separately heat the separated milk and the cream, or only one of these constituents, the two constituents being then mixed again, and the evaporation completed. This enables the milk to be treated at a higher temperature than the more sensitive cream, but the final product obtained is not of uniform solubility, appearance, and flavor. This was due either to the fact that the milk-layers were subjected to too intense one-sided heating, while the air acted unfavorably on the other side, or that the milk, treated in a closed chamber, was heated too intensely and suddenly on both sides, so that it was in part burned. These disadvantages are obviated by the present invention.

In the improved apparatus a layer of the liquid mass, or of one of the constituents thereof, for example skim-milk, is first dried on one side, by passing over a heated revolving drum, and is then turned and passed on to another heating drum revolving in the opposite direction. The second drum may already have upon it a layer of another mass, for example cream. The exposed surface of the layer is acted on, during the drying operation, by a stream of gas, for example purified, dry air, or air from which oxygen has been separated, the gas being hot or cold according to requirements. The treatment takes place in a dark chamber, from which the atmosphere is excluded, and in which a pressure above atmospheric pressure can be maintained.

A construction embodying the invention is shown in the accompanying drawing, which is a sectional elevation of the apparatus.

In the drawing $c$ represents the closed chamber or casing of the apparatus, which may have windows but from which light is otherwise excluded. In this casing are two drums $a$ and $b$, placed adjacent to one another and connected to means for rotating them in opposite directions. It is not essential for the purposes of this invention that the drums are placed one above the other. In the gap between the drums there is a scraper $d$ having an edge adjacent the surface of the drum $a$, and a rearward extension $e$ substantially parallel with a portion of the surface of the drum $b$. Another scraper $f$ is arranged adjacent the drum $b$ in the mouth of a discharging duct which traverses the wall of the casing.

In the treatment of milk which has been separated into skim-milk, and cream, the skim-milk is introduced into the casing through a duct $g$, whence it drops into a pan $l$ in or formed by the bottom of the casing a thin layer or film being taken up by the drum $a$. Instead of this arrangement a distributer may be used for applying the layer to the drum. At the same time a layer of cream is applied to the drum $b$ by means of a distributer $x$. If only one mass is to be treated the distributer $x$ may be dispensed with.

Streams of air are admitted to the casing through pipes $h$ and $i$, which direct the air on to the drums $a$ and $b$ respectively. The drums are internally heated and revolved by any suitable means. In general the speed imparted to the drums will be proportional to the temperature to which the drums are raised. In the treatment of skim milk, and cream, the drum $a$ is heated to a higher temperature than the drum $b$ but its temperature is preferably kept below the point at which albumen becomes insoluble. The temperature of the cream-drum is kept below the point at which the fat is deleteriously affected.

In the treatment of skim-milk and cream the heat of the drum $a$ acts directly on the inner surface of the applied layer of skim-milk while the stream of air directed against the drum carries away the vapor generated. The air and vapor leave the casing at $k$, if necessary or desirable, suction may be applied at $k$ to accelerate the removal. When the layer of condensed skim-milk, already nearly dry, reaches the scraper $d$ it is lifted from the drum and deflected by the guide $e$ on to the drum $b$, the direction of rotation of which is opposed to that of the drum $a$. By its deflection at $d\ e$ it is turned and laid upon the layer of moist cream on the drum $b$. The skim-milk layer absorbs moisture from the cream, and the fat-globules are to some extent drawn into the albuminous layer, through which the moisture passes to the outer surface, in order to be removed by the stream of air acting on the drum. The heat of the condensed skim-milk layer assists in drying the cream, the drying of both layers being completed by the drum $b$, whereupon the combined layers are scraped off the drum by the scraper $f$ and pass through the discharge-duct out of the casing.

The temperatures used may be so regulated as to produce, as final product, either a pasty mass or a mass which can be readily pulverized. For the latter purpose the cream-drum is heated to the highest admissible temperature, and the condensed skim-milk is applied to the cream-layer in the form of a strongly coherent layer. For producing a pasty mass the cream-drum is heated very slightly, or not at all, and the layer of condensed skim-milk is applied as before and then quickly removed. The pasty mass produced is more suitable than milk-powder for some purposes, for example for use in the manufacture of chocolate, and is much more durable.

For treating a single mass, both the drums are, in general, heated to the same temperature. The mass introduced at $g$ is taken up by the drum $a$, partly dried thereon, scraped off and deflected at $d\ e$, and directly applied to the surface of the drum $b$, by the heat of which the drying is completed.

The process may be modified by using the drums at normal temperature, or cooling them, and introducing streams of hot air. The drums may be side by side instead of one above the other, and skim-milk may be first applied to the upper drum, and cream to the lower. The liquid mass may be sprayed, poured or otherwise applied to the drums. For some purposes the entire casing may be artificially heated or cooled. The scrapers may be of rigid or elastic material.

What I claim as my invention and desire to secure by Letters Patent of the United States is:—

1. In apparatus for condensing or drying milk and other liquids the combination with an inclosing casing adapted to have a vacuum created therein, of two heater drums revoluble in opposite directions, means for applying the liquid to the one drum and means for directly transferring the film of partially dried liquid from said drum and applying it to the other drum.

2. In apparatus for condensing or drying milk and other liquids, the combination of two heater surfaces and means for directly transferring the film of partially dried liquid from the one surface to the other, the surfaces acting in succession on opposite sides of the film.

3. In apparatus for condensing or drying milk and other liquids the combination of two drums revoluble in opposite directions, means for applying the liquid to the one drum and means for transferring the film of partially dried liquid from said drum and applying it to the other drum, together with means for applying another liquid to the second drum.

4. In apparatus for condensing or drying milk and other liquids the combination of two drums revoluble in opposite directions, means for applying the liquid to the one drum and means for transferring the film of partially dried liquid from said drum and applying it to the other drum, together with means for applying another liquid to the second drum prior to the transference of the said film thereto.

5. In apparatus for condensing or drying milk and other liquids the combination of two drums revoluble in opposite directions, means for applying the liquid to the one drum and means for transferring the film of partially dried liquid from said drum and applying it to the other drum, together with means for applying another liquid to the second drum and means for heating the drums to different temperatures.

In witness whereof I have signed this specification in the presence of two witnesses.

MAX TÖPFER.

Witnesses:
 RUDOLPH FRICKE,
 SOUTHARD P. WARNER.